United States Patent [19]

Naito

[11] Patent Number: 5,081,527
[45] Date of Patent: Jan. 14, 1992

[54] DIGITAL IMAGE FORMING APPARATUS

[75] Inventor: Yoshikazu Naito, Osaka, Japan

[73] Assignee: Minolta Camera Kabushiki Kaisha, Osaka, Japan

[21] Appl. No.: 649,323

[22] Filed: Jan. 31, 1991

Related U.S. Application Data

[63] Continuation of Ser. No. 336,060, Apr. 11, 1989, abandoned.

[30] Foreign Application Priority Data

Apr. 12, 1988 [JP] Japan ................................. 63-89729
Apr. 12, 1988 [JP] Japan ................................. 63-89730

[51] Int. Cl.$^5$ .............................................. H04N 1/46
[52] U.S. Cl. ........................................ 358/75; 358/80
[58] Field of Search ....................... 358/78, 75, 80, 81

[56] References Cited

U.S. PATENT DOCUMENTS

| 4,275,958 | 6/1981 | Tachika et al. ................. 355/14 R |
| 4,387,297 | 6/1983 | Swartz et al. ..................... 235/462 |
| 4,477,833 | 10/1984 | Clark et al. ........................ 358/78 |
| 4,603,262 | 7/1986 | Eastman et al. ................. 235/462 |
| 4,674,861 | 6/1987 | Kawamura ........................ 358/75 |
| 4,717,954 | 1/1988 | Fujita et al. ....................... 358/80 |
| 4,755,852 | 7/1988 | Fujita ............................... 355/14 R |
| 4,794,419 | 12/1988 | Shibazaki et al. .............. 355/3 R |
| 4,825,246 | 4/1989 | Fukuchi et al. ...................... 355/4 |
| 4,839,722 | 6/1989 | Barry et al. ........................ 358/75 |
| 4,876,571 | 10/1989 | Nakamura et al. ............. 355/210 |

FOREIGN PATENT DOCUMENTS

| 49-131317 | 4/1973 | Japan . |
| 54-104834 | 8/1979 | Japan . |
| 55-123270 | 9/1980 | Japan . |
| 56-83757 | 7/1981 | Japan . |
| 57-61372 | 4/1982 | Japan . |
| 60-216670 | 10/1985 | Japan . |
| 60-239764 | 11/1985 | Japan . |

Primary Examiner—Jin F. Ng
Assistant Examiner—Jerome Grant, II
Attorney, Agent, or Firm—Burns, Doane, Swecker & Mathis

[57] ABSTRACT

A digital color copying apparatus for forming a color copy in which an arbitrary color in a color original image is replaced by a desired color comprises bar codes for determining whether the desired color is a color in the original image or a color in the copy image and designating the desired color, and a bar code reading pen. When the bar code reading pen reads the bar codes, it is determined whether the designated color is a color in the original or not and the color is definitely specified.

12 Claims, 14 Drawing Sheets

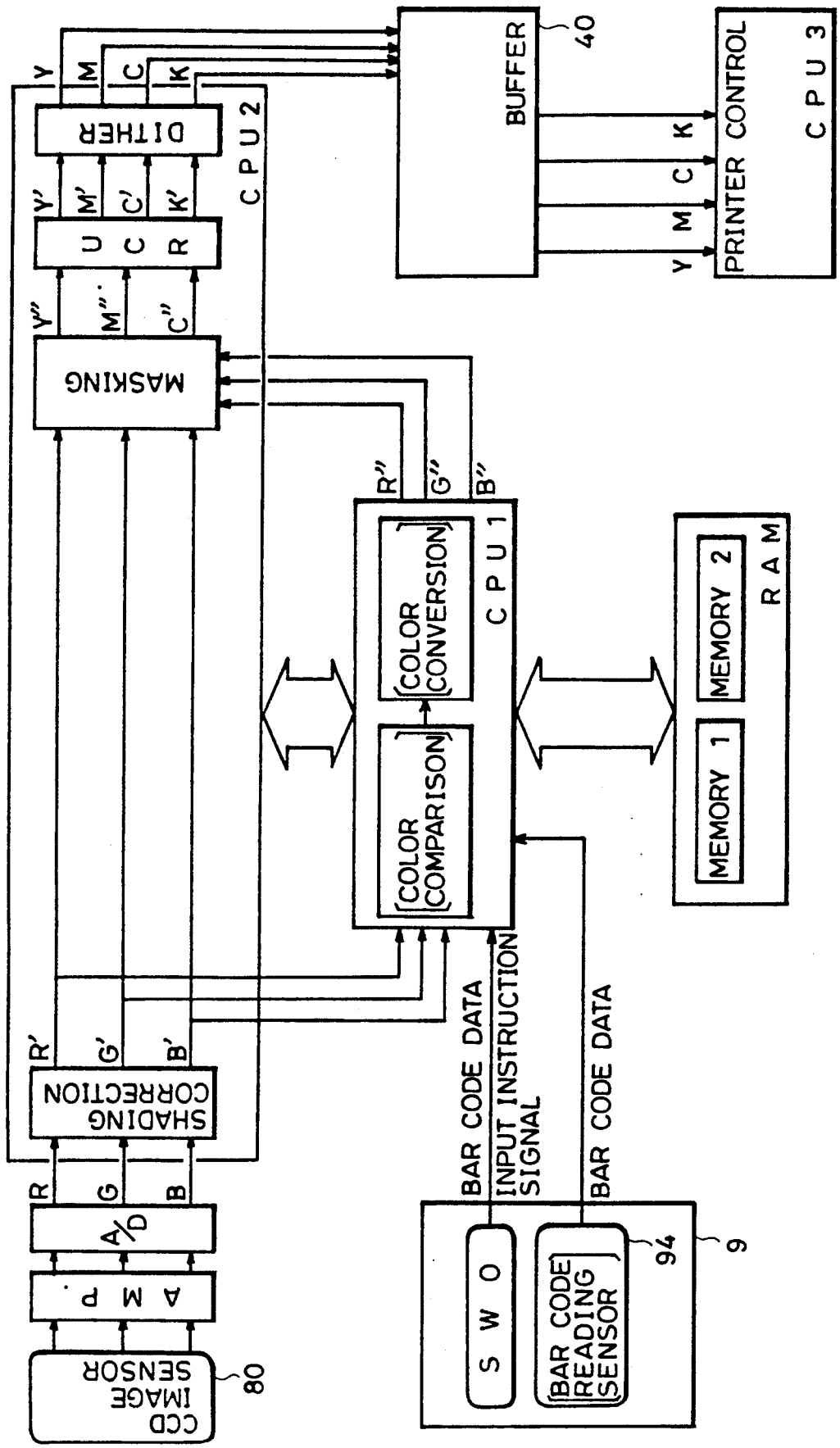

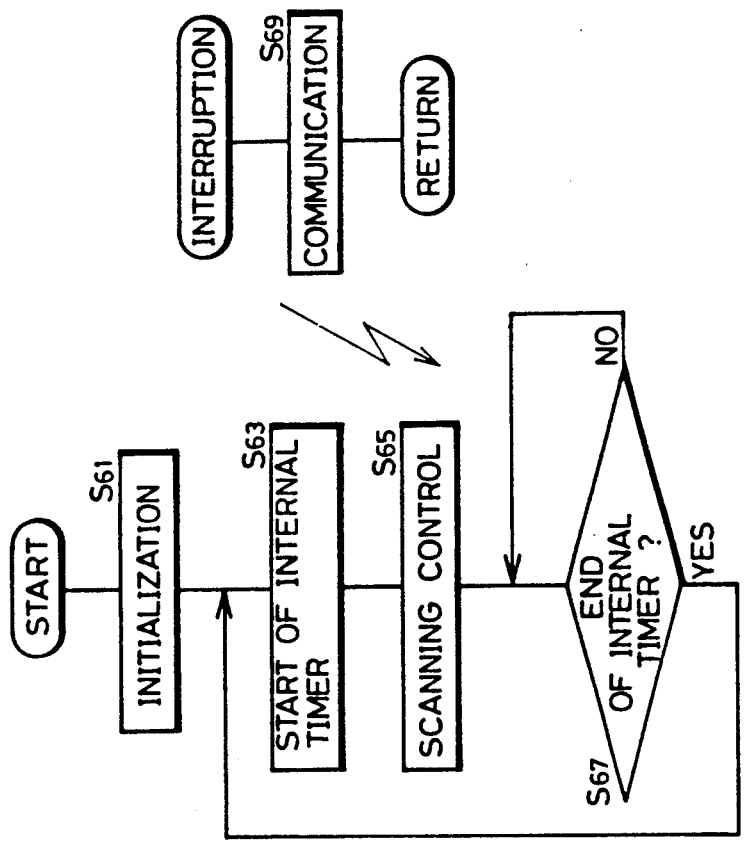
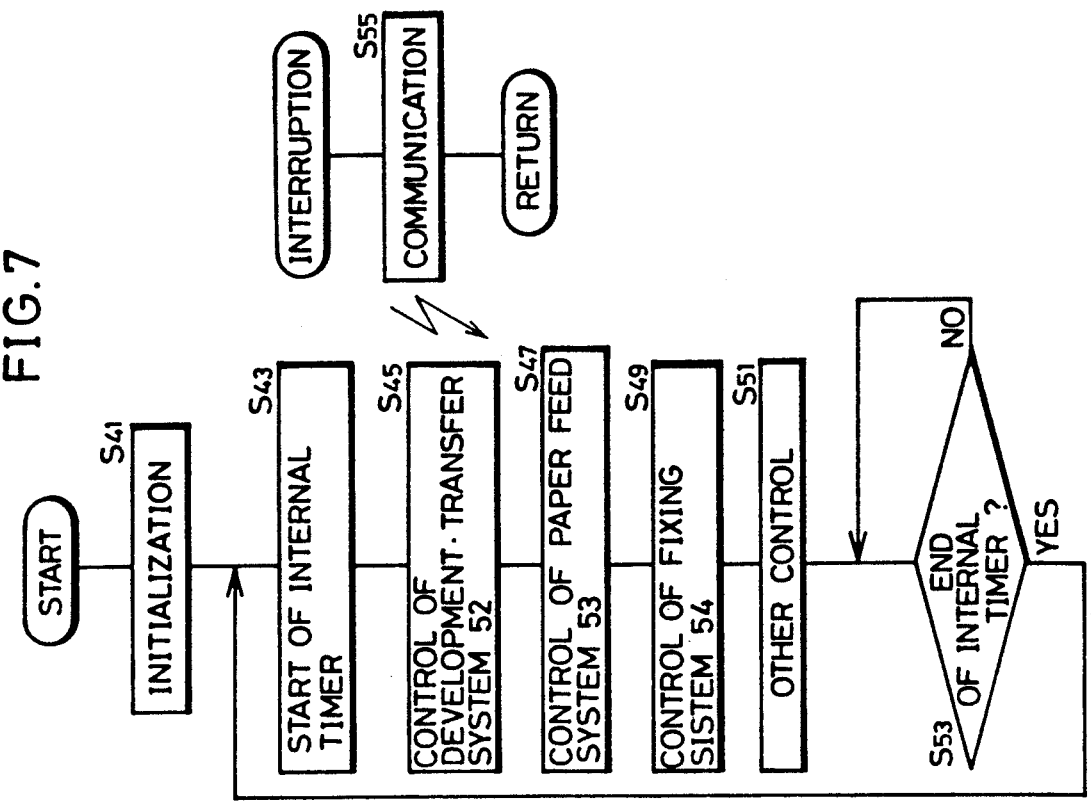

DIGITAL IMAGE FORMING APPARATUS

This is a continuation of application Ser. No. 07/336,060, filed Apr. 11, 1989 now abandoned.

BACKGROUND OF THE INVENTION

1. Field of the Invention

The present invention relates to a digital image forming apparatus and particularly to a digital image forming apparatus capable of forming a color image in which an arbitrary color in a color original image is replaced by another arbitrary color different from the above mentioned arbitrary color.

2. Description of the Related Art

Digital image forming apparatus for forming a color image on paper have been proposed. Such a conventional digital image forming apparatus comprises a CCD image sensor for obtaining a digital image signal (for each of three primary colors RGB) from a color original image. A predetermined processing signal (for shading correction, color masking processing, underlying color removing processing, dither processing etc.) is applied to the image signal read by the image sensor. A printer (such as a laser printer, an LED printer or a liquid crystal display shutter printer) is driven by using the processed signal, so that a color image is formed on paper.

The conventional digital image forming apparatus includes an apparatus having a function of forming a color image in which an arbitrary color in an original image is replaced by another arbitrary color different therefrom, namely, a color conversion function.

Such an apparatus having the color conversion function designates arbitrary colors (i.e., an arbitrary color in an original image and another arbitrary color different therefrom for the conversion) in the below described manner.

(a) An arbitrary color is designated by operation of key switches on an operation panel or the like of the apparatus, those key switches corresponding to predetermined colors (normally, eight colors of R (red), G (green), B (blue), Y (yellow), M (magenta), C (cyan), K (black) and W (white) with a 1:1 relation.

(b) Coordinates of a desired color (a color to be designated as the above mentioned arbitrary color) in a color original image are inputted by using an edition coordinate input device. After that, the color original document is placed on the platen of the image forming apparatus and the color of the above mentioned coordinates is read by a CCD image sensor of the image forming apparatus, whereby the desired color is designated.

According to the above mentioned method (a), the key switches and the colors have the 1:1 correspondence. Accordingly, the method (a) has a disadvantage that the number of colors to be designated is limited by the number of key switches which can be provided on the panel or the like. On the other hand, according to the method (b), operations such as coordinate input operation and preliminary scanning of the CCD image sensor are complicated. Further, an additional device such as the coordinate input device is required.

SUMMARY OF THE INVENTION

Therefore, an object of the present invention is to designate easily colors of an original and an image for color conversion in an image forming apparatus.

Another object of the present invention is to impose no limitation on the number of designated colors of an original and an image for color conversion.

A further object of the present invention is to provide an image forming apparatus which does not require a special device for designation of colors of an original and an image for color conversion.

A further object of the present invention is to change easily plural colors of an original in an image forming apparatus.

In order to attain the above described objects, an image forming apparatus according to the present invention, for forming an image containing a plurality of colors from an original document containing a plurality of colors includes: an original document reader for reading the original document and outputting color signals according to the plurality of colors; bar codes for identifying a desired color and the attributes thereof out of the plurality of colors of the original document or the image, the attributes including a first attribute for identifying the desired color as a color of the original document and a second attribute for identifying the desired color as a color of the image; a bar code reader for reading the bar codes and outputting signals specifying the desired color and the attributes; a color signal converter for converting the color signals read by the original document reader in response to the output signals of the bar code reader; and an image forming device for forming the image based on a color signal obtained by the conversion by the color signal converter.

Since the image forming apparatus is thus constructed, an operation for replacing a color of an original document by a color of an image is effected by using the bar codes and the bar code reader. As a result, the colors of the original document to be changed and the colors of the image replacing the same can be designated easily in the image forming apparatus.

According to a preferred embodiment of the invention, the color signal converter converts a signal of a first desired color specified by the first attribute and a signal of a second desired color specified by the second attribute, and the bar code reader include a first memory for storing the first desired color and a second memory for storing the second desired color.

Since the image forming apparatus is thus constructed, a plural number of colors to be changed on an original document are designated simultaneously and stored in the memories. As a result, the plural number of colors on the original document can be changed easily in the image forming apparatus.

According to another aspect of the invention, an image forming apparatus for forming an image containing a plurality of colors from an original document containing a plurality of colors and having ten keys for designating the number of formations of the image includes: the ten keys having a function of designating the respective colors; an original document reader for reading the original document and outputting color signals according to the plurality of colors; a color identifying device for identifying the color designated by the ten keys as a first color corresponding to a color of the original document or a second color corresponding to a color of the image; a color signal converter for converting the color signals read by the original document reader in response to outputs of the color identifying device and the ten keys; and an image forming device for forming the image based on color signals obtained by the conversion by the color signal converter.

Since the image forming apparatus is thus constructed, colors of an original document to be changed and colors of an image replacing the original colors are designated by using the ten keys normally attached to the image forming apparatus. As a result, a special device for designation of the colors for the change is not required in the image forming apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a construction of an image signal processing circuit in the copying apparatus.

FIGS. 5 to 8 are flow charts showing a main routine of processing in a control CPU of the copying apparatus.

DESCRIPTION OF THE PREFERRED EMBODIMENTS

First Embodiment

Description of Mechanism

Figure 1:
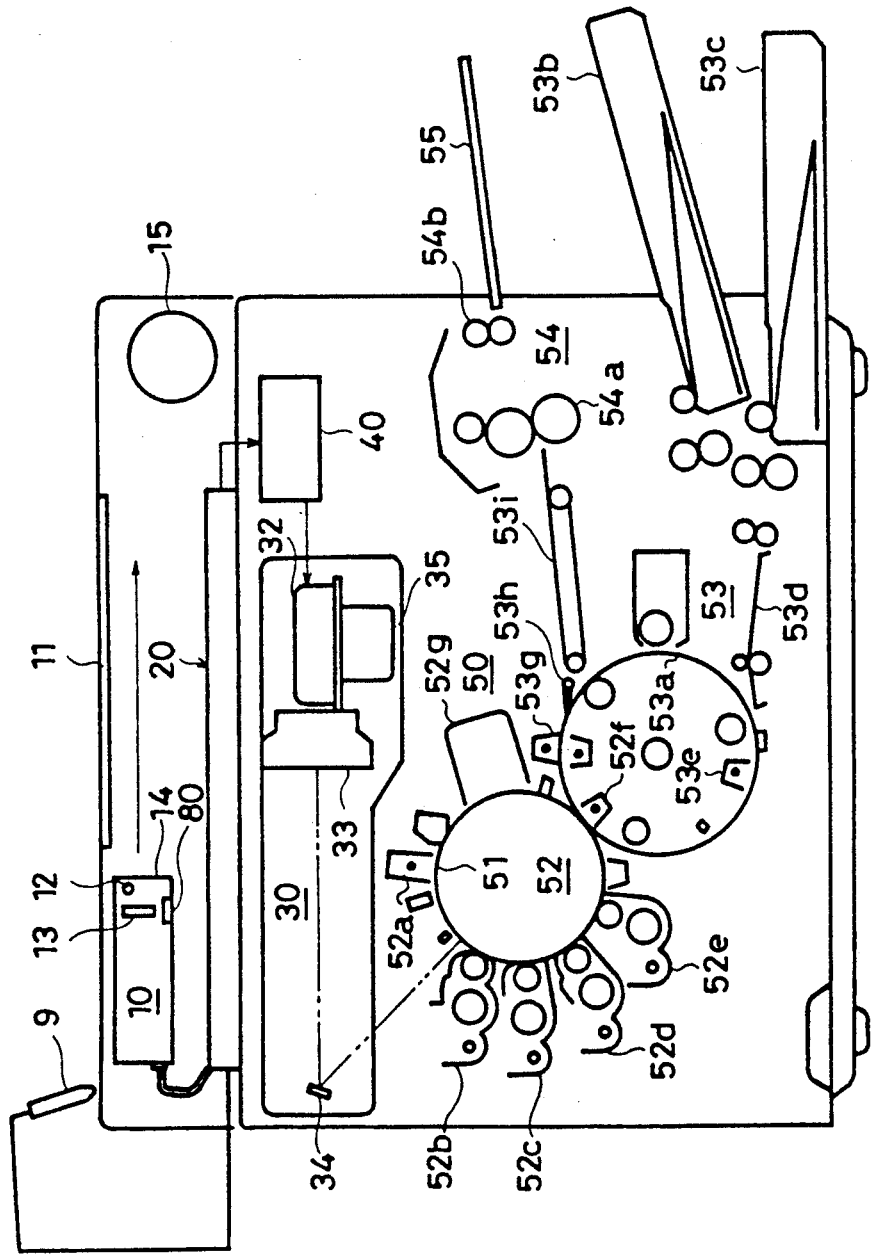
FIG. 1 is a schematic view showing a construction of a digital copying apparatus according to an embodiment of the present invention.
Figure 2:
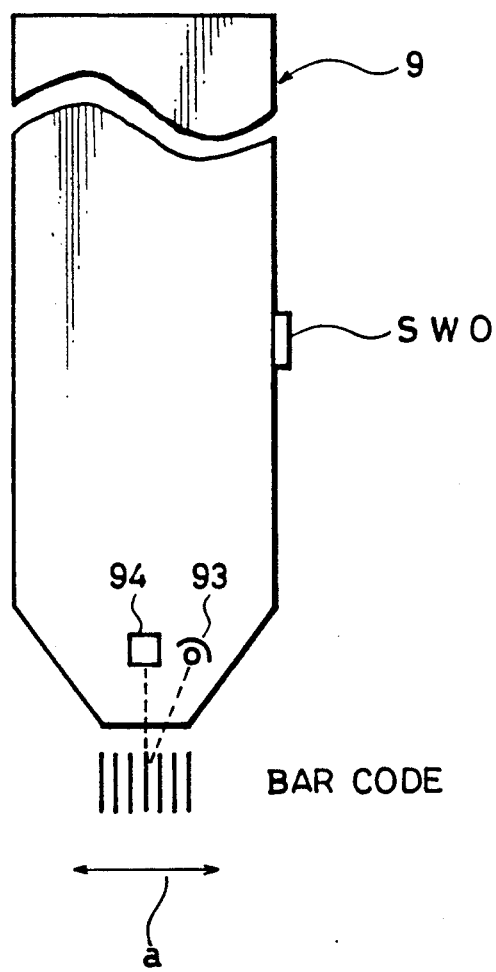
FIG. 2 is a schematic illustration showing a structure of a color designation pen used as color designating means in the copying apparatus.

FIG. 1 is a schematic view showing a construction of a digital copying apparatus according to the first embodiment of the present invention. FIG. 2 is a schematic illustration showing a structure of a color designation pen used as designated color input means in the first embodiment.

The copying apparatus comprises a scanning system 10, an image signal processing unit 20, an optical system 30, an image forming system 50, and a color designation pen 9 as the designated color input means.

(1) Scanning System 10

The scanning system 10 scans a surface of an original placed on a platen glass 11 by applying light thereto and converts light reflected from the original surface to an electric signal. The conversion to an electric signal is effected for each of the three elements red R, green G and blue B.

The scanning system 10 comprises an exposure lamp 12 for irradiating the original surface, a lens of array 13 of a bundle of optical fibers of graded index for converging reflected light from the original surface, and a one-dimensional CCD image sensor 80 for receiving the converged reflected light and converting it to an electric signal. The scanning system 10 is mounted as a unitary body on a scanner 14 and it moves under the platen glass 11 and in parallel therewith. When the scanning system 10 moves in the direction of the arrow, the original surface is scanned by exposure. The scanning system 10 is driven by a motor 15.

(2) Image signal Processing Unit 20

The image signal processing unit 20 comprises a CPU1 and a CPU2 to be described later. The image signal processing 20 processes an image signal (for each of the three components R, G and B) outputted from the image sensor 80 and converts it to an image signal corresponding to any of four toner colors Y (yellow), M (magenta), C (cyan), and K (black).

The image signal processing unit 20 will be described in detail afterwards in connection with the description of the control circuit.

(3) Optical System 30

The optical system 30 comprises a semiconductor laser and a collimator lens not shown, as well as a polygon mirror 32, a lens 33 and a mirror 34. The optical system 30 forms an electrostatic latent image on a photoconductor drum 51 by applying a laser beam thereto.

The semiconductor laser generates a laser beam modulated by image information outputted for one line from the image processing unit 20 through a buffer 40. The laser beam is reflected on the polygon mirror 32 and the direction thereof is changed so that scanning can be effected on the photoconductor drum 51 along a line direction (namely, the axial direction of the drum 51, which is perpendicular to the surface of the drawing). The polygon mirror 32 has a regular polygon form and each of its side faces serves as a face on which the laser beam is reflected. The polygon mirror 32 is rotated at high speed to enable an angle of reflection of the laser beam to be changed, whereby scanning along the line direction can be effected. The laser beam reflected on the polygon mirror 32 is converted through the lens 33 so as to be focused on the surface of the photoconductor drum 51 and thus it falls thereon after reflection on the mirror 34. The polygon mirror 32 is rotated by a motor 35.

(4) Image Forming System 50

The image forming system 50 comprises a development-transfer system 52, a paper feeding system 53, and a fixing system 54. The image forming system 50 develops the electrostatic latent image formed on the surface of the photoconductor drum 51 and transfers the image onto paper.

The development-transfer system 52 includes the photoconductor drum 51 as well as components disposed around the drum 51, namely a corona charger 52a for uniformly charging the surface of the photoconductor drum 51, a developing unit 52b containing toner of the color Y (yellow), a developing unit 52c containing toner of the color M (magenta), a developing unit 52d containing toner of the color C (cyan), a developing unit 52e containing toner of the color K (black), a transfer charger 52f for transferring a toner image developed on the surface of the photoconductor drum 51 onto paper, and a cleaning device 52g for removing toner remaining on the surface of the photoconductor drum 51, etc.

The paper feeding system 53 feeds paper. The paper feeding system 53 includes two paper cassettes 53b and 53c storing paper sheets of different sizes, a paper guide 53d for guiding the paper fed from either paper cassette, an absorption charger 53e for electrically absorbing and winding the paper guided on the guide 53d onto a drum 53a, a separation charger 53g for separating, from the drum 53a, the paper on which four transfers for the four colors Y, M, C and K are completed, a separation claw 53h having the same function, and a transport belt 53i for transporting the paper separated from the drum 53a to the fixing system 54, etc.

The fixing system 54 thermally fixes the toner image transferred on the paper by means of fixing rollers 54a. The paper on which the image is fixed is discharged from discharge rollers 54b to an outlet tray 55.

(5) Color Designation Pen 9

The color designation pen 9 is disposed near the operation panel of the copying apparatus and it is electrically connected to the image signal processing unit 20. The color designation pen 9 is used for designation of colors, for example, designation of a color A in an original image and another color B to replace the color A. In the following, the color A is called a color before conversion and the color B is called a color after conversion.

An exposure lamp 93, and a photosensor 94 for receiving reflected light from a bar code are provided in a top end portion of the color designation pen 9 as shown in FIG. 2. The pen 9 moves across the bar code (in the direction of the arrow a) while the lamp 93 applies light to the bar code, whereby the bar code is read.

A switch SW0 is provided on a lateral portion of the color designation pen 9. The switch SW0 is a switch for instructing a start of reading a bar code.

Figure 12:
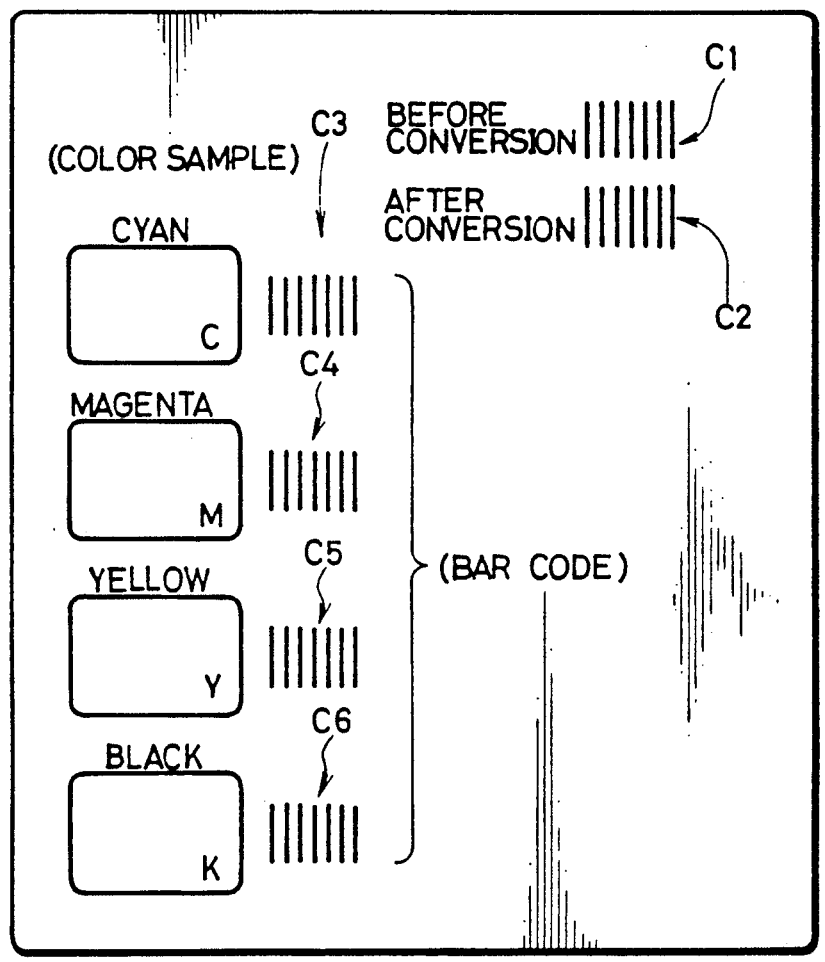
FIG. 12 is a diagram showing an example of bar codes read by the color designation pen.

FIG. 12 is an illustration showing an example of combination of bar codes read by the color designation pen 9.

As shown, according to this embodiment, the bar codes C3, C4, C5 and C6 correspond to the colors C, M, Y and K and the bar code of a color to be designated is read by the color designation pen 9. Designation of the read color as a color before conversion or as a color after conversion is inputted by using the bar codes C1 and C2.

For example, after the bar code Cl "before conversion" is read by the color designation pen 9, any of the bar codes C3, C4, C5 and C6 is read by the color designation pen 9 in the same manner. Then, the data thus read is stored in the memory 1 as color data.

Description of Control Circuit

Figure 3:
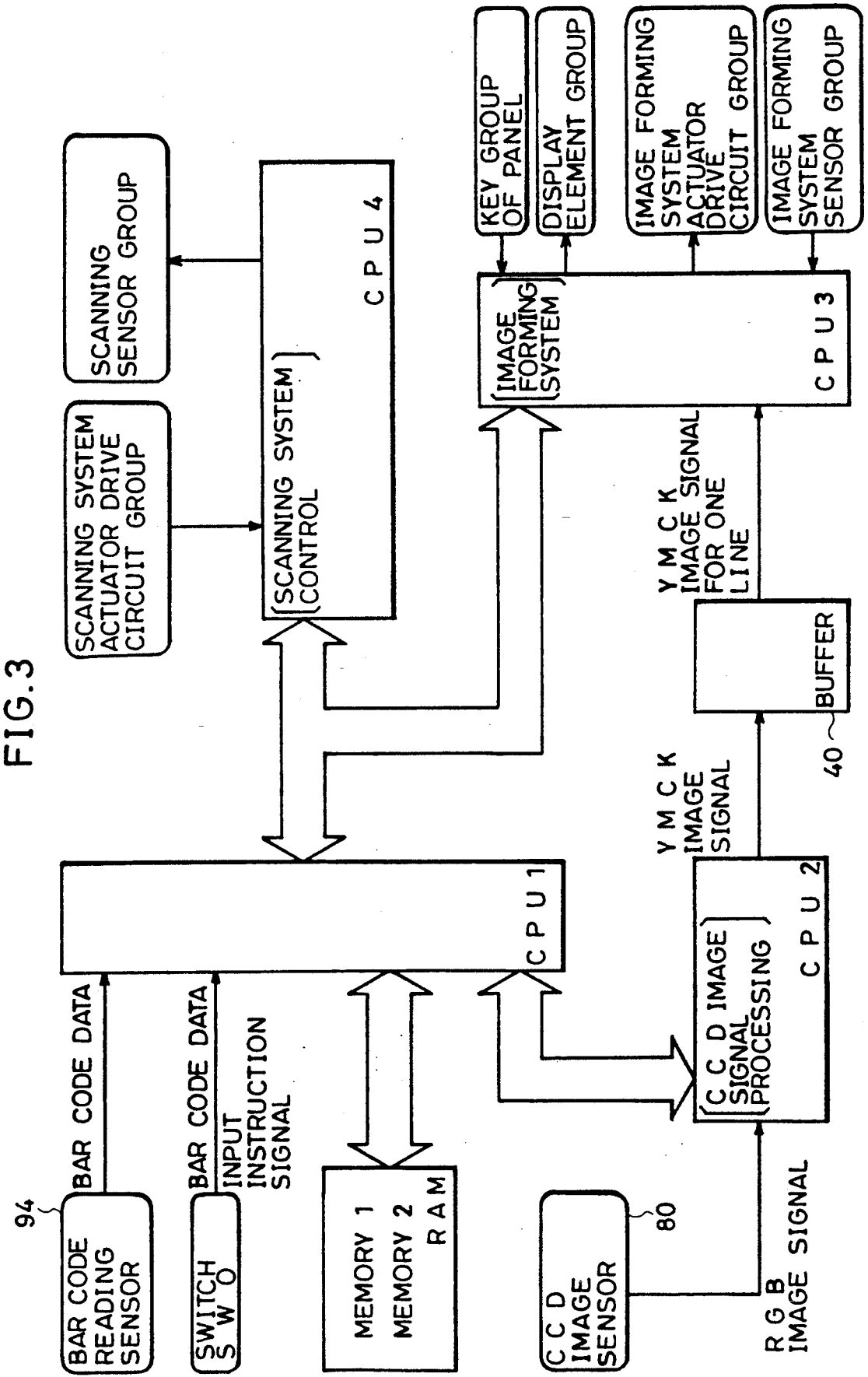
FIG. 3 is a block diagram showing a construction of a control circuit of a copying apparatus according to the embodiment of the invention.
Figure 6:
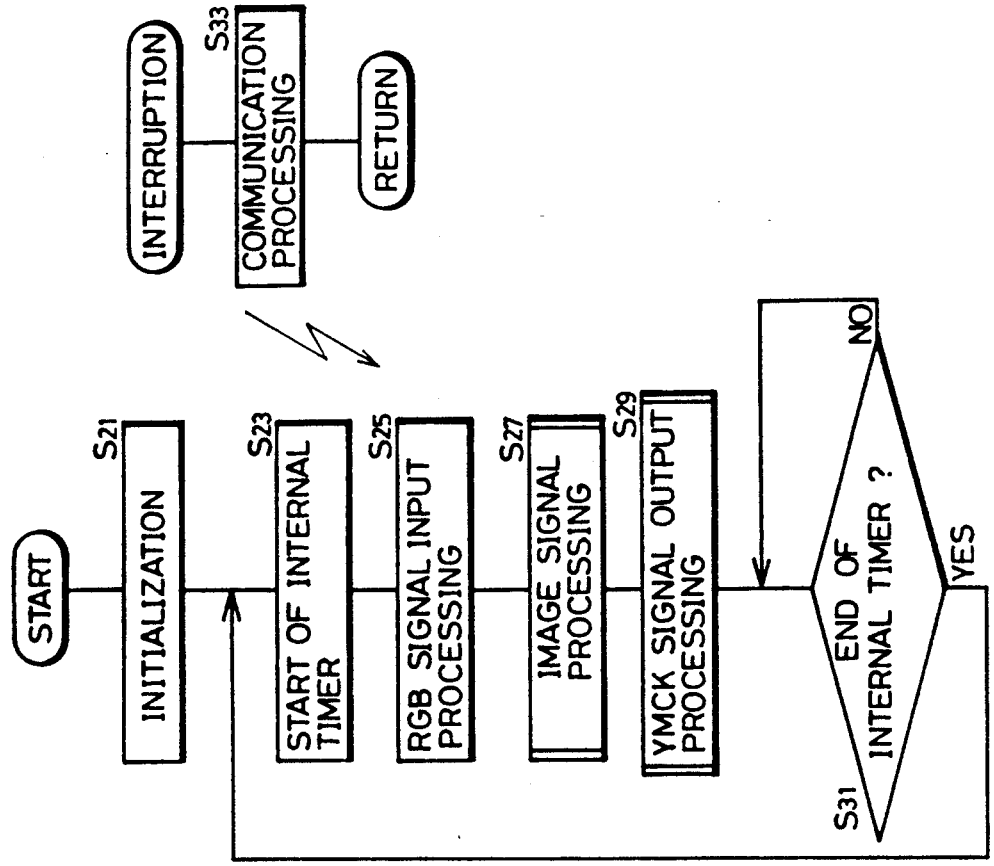

FIG. 3 is a block diagram of a control circuit of the apparatus of this embodiment and FIG. 4 is a block diagram of the control circuit showing mainly an image signal processing unit 20.

As shown in FIG. 3, the control circuit of the apparatus of this embodiment includes four CPUs (i.e., CPU1, CPU2, CPU3 and CPU4) and those CPUs are connected through a bidirectional bus.

The CPU1 decodes the bar code data transmitted from the color designation pen 9 and stores color data before conversion in the memory 1 and color data after conversion in the memory 2. The CPU1 compares the data stored in the memory 1 with image data transmitted from the CPU2 and executes processing for replacing color data of an image area of the same color as that of the data in the memory 1 by the color data stored in the memory 2.

The CPU2 effects control in the following manner. When image data (a signal R·G·B) from the CCD image sensor 80 is inputted, image data processing (such as shading correction, color masking processing, underlying color removing processing and dither processing as shown in FIG. 4) is normally applied to the image data. The image data thus processed is converted to a signal Y·M·C·K (a signal for writing an electrostatic latent image corresponding to toner developer of yellow, magenta, cyan or black), so that the signal is outputted to a buffer 40. In this embodiment, the CPU for such normal image processing is formed by a single CPU (i.e., the CPU2). A dedicated CPU may be provided for each processing (each of the shading correction, color masking processing, underlying color removing processing and dither processing) and processing timing of each of such CPUs may be controlled by a controller specially provided.

The CPU3 controls the image forming system. More specifically, the CPU3 controls operations related with printing, such as input processing through key switches from the operation panel not shown, charging control for the photoconductor drum 51, four developing operations using toners of the four colors Y, M, C and K and feeding of paper.

The CPU4 controls operations of the scanning system and the optical system.

The above described respective CPUs perform control as described below with appropriate timings.

Description of Operation

In the following, operation of the apparatus of this embodiment will be described with reference to flow charts.

Before the explanation of the flow charts, terms "on edge" and "off edge" will be defined as below.

A change from an off state to an on state of the switches, sensors, signals and the like is defined as "on edge".

A change from an on state to an off state of the switches, sensors, signals and the like is defined as "off edge".

I. Description of Main Routine

FIGS. 5 to 8 are flow charts showing processing in the above described four CPUS (i.e., CPU1, CPU2, CPU3 and CPU4). As shown, those CPUs communicate data with each other by interruption and execute control procedures described below in detail.

(1) CPU1: FIG. 5

The CPU1 controls designation of colors, processing of conversion of the designated color, and other processing.

Figure 5:
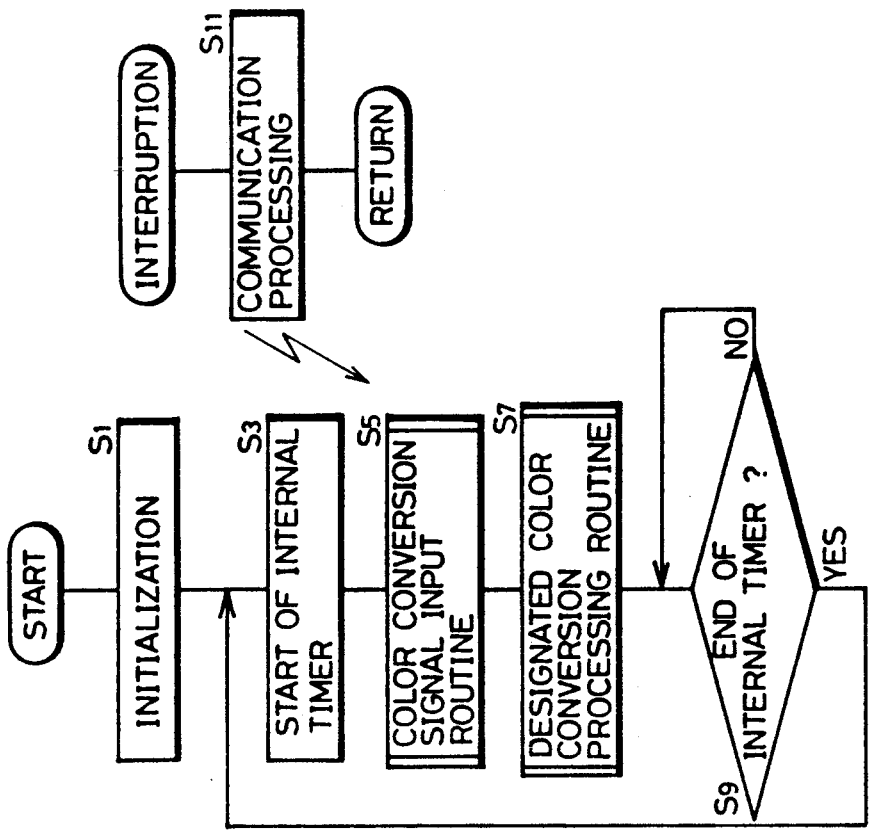

Referring to FIG. 5, the CPU1 controls a color conversion signal input routine (in step S5) in which color data before conversion and color data after conversion are stored in the memories according to the input signal from the color designation pen 9, and a designated color conversion processing routine (in step S7) in which an area of the same color as the color stored in the memory 1 (i.e., the color before conversion) and contained in an image signal transmitted from the CPU2 is replaced by the color stored in the memory 2 (i.e., the color after conversion).

Details of the processing in steps S5 and S7 will be described afterwards.

(2) CPU2: FIG. 6

The CPU2 controls various processing for the image signal transmitted from the CCD image sensor 80.

As shown, the CPU2 controls image signal processing as described below. The image signal inputted from the CCD 80 (i.e., the image signal for each of the three components R, G and B (in step S25) is subjected to normal image signal processing such as shading correction, color masking processing, underlying color removing (UCR) processing and dither processing as shown in FIG. 4. The image signal thus processed is converted to an image signal (corresponding to each of the four toner colors Y, M, C and K) for modulating a laser beam for writing the electrostatic latent image (in step S27) and the image signal thus obtained is outputted to the buffer 40 (in step S29).

Details of the processing in step S27 will be described afterwards.

(3) CPU3: FIG. 7

The CPU3 controls processing for controlling the operation of the image forming system.

As shown, the CPU3 controls procedures of (a) to (d) as described below.

(a) Control of the Developing-Transfer System 52 (S45)

Control procedures are executed for rotation of the photoconductor drum 51, charging of the photoconductor drum 51, development of an electrostatic latent image formed on the drum 51 (four developing operations by using four colors of Y, M, C and K), transfer of the developed toner image onto paper (four transfer operations for the toner image having the four colors of Y, M, C and K) etc.

(b) Control of the Paper Feed System 53 (S47)

Control procedures are executed for paper feeding from the paper storing cassettes 53b and 53c, winding of the fed paper onto the drum 53a (by utilizing electrostatic absorption force), rotation of the drum 53a (synchronizing with transfer timing), separation of the paper from the drum 53a after termination of the transfer (i.e., termination of the four transfer operations of the toner image having the four colors of Y, M, C and K) etc.

(c) Control of the Fixing System 54 (S49)

Control procedures are executed for thermal fixation of an image (a full color image) transferred on the paper, temperature control of the fixation rollers 54a, discharge of the paper after the fixation etc.

(d) Other Control (S51)

Control procedures are executed for acceptance of input through key switches from the operation panel not shown, drive of various display LEDs on the operation panel, acceptance of signals from various sensors provided in the image forming system etc.

Since the control procedures of the CPU3 in this embodiment are well known, detailed description thereof is omitted.

(4) CPU4: FIG. 8

The CPU4 controls processing such as control of operation of the scanner 14 in the scanning system.

As shown, the CPU4 executes processing (in step S65) such as regulation of the moving timing of the scanner 14 (as shown in FIG. 1) containing the CCD 80, setting of a moving speed of the scanner 14, regulation of illumination timing of the exposure lamp 12, regulation of an exposure amount of the lamp 12, regulation of output timing of an image signal from the CCD 80, etc.

Since the control of the CPU4 in this embodiment is well known, detailed description thereof is omitted.

II. Description of Respective Subroutines (1) Color Conversion Signal Input Routine (S5)

Figure 9:
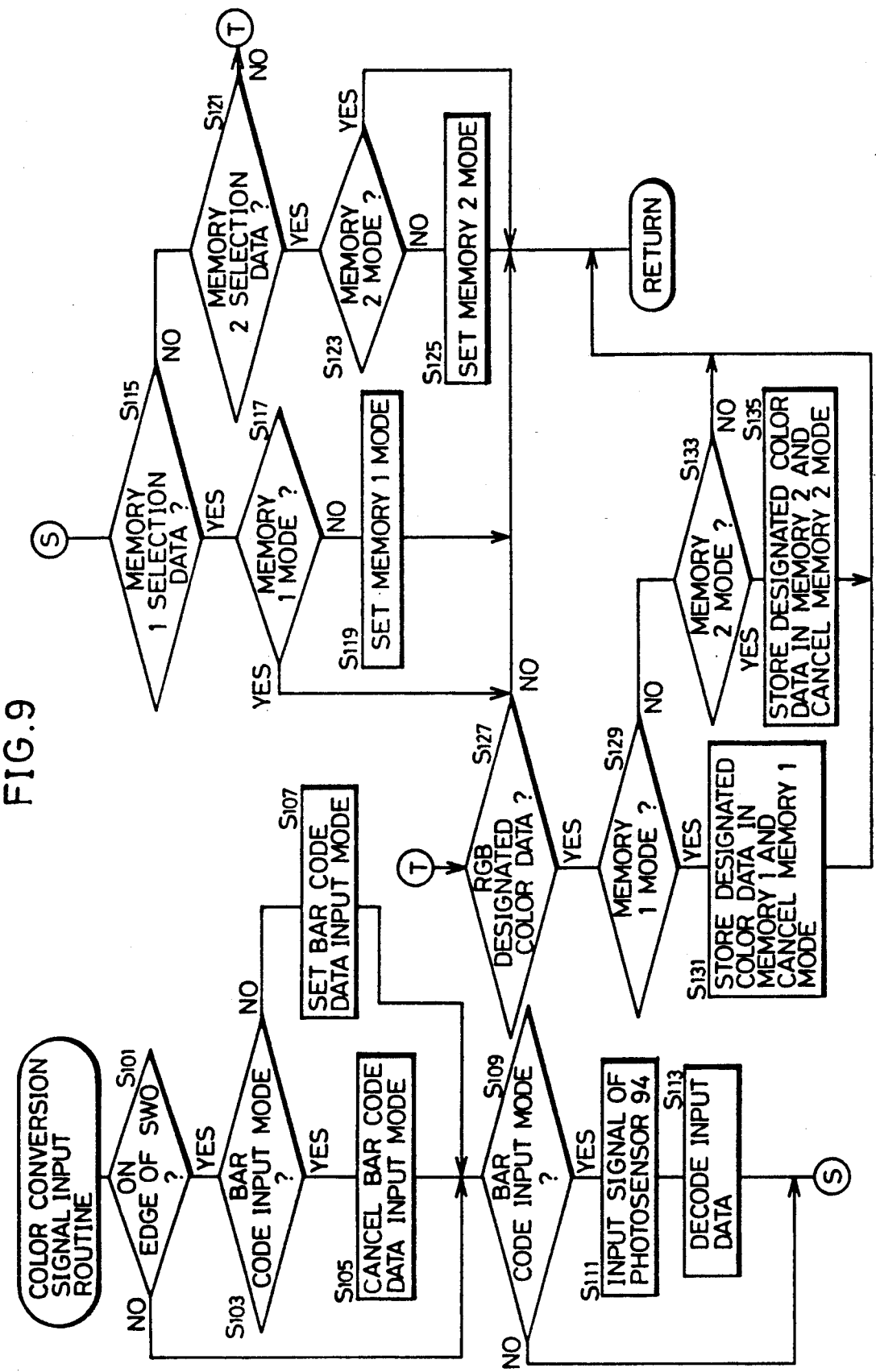
FIG. 9 is a flow chart showing a color conversion signal input subroutine of a CPU1.

FIG. 9 is a flow chart showing details of step S5 (concerning the color conversion signal input routine) called by the processing of the CPU1.

In this subroutine, first of all, a bar code data input mode is set or cancelled dependent on the on edge of the switch SW0.

More specifically, if the bar code data input mode is already set (YES in S103) at the on edge of the switch SW0 (YES in step S101), the bar code data input mode is cancelled (in step S105). Conversely, if the bar code data input mode is not set (NO in step S103), the bar code data input mode is set (in step S107).

At the time of setting the bar code data input mode, a signal inputted from the photosensor 94 is applied (in step S111) and the inputted signal is decoded (in step S113).

If it is determined as a result of the decoding of the input signal that the input signal represents data for instructing selection of the memory 1, that is, the bar code C1 in FIG. 12 is read (YES in step S115), a memory 1 mode is set (in step S119). If the signal represents data for instructing selection of the memory 2, that is, the bar code C2 in FIG. 12 is read (NO in step S115 and YES in S121), a memory 2 mode is set (in step S125). However, if the memory 1 mode is already set (YES in step S115 and YES in step S117), or if the memory 2 mode is already set (NO in step S115, YES in step S121 and YES in step S123), the inputted bar code data is disregarded and the processing flow returns to the main routine.

If it is determined as a result of the decoding of the input signal that the input signal represents bar code data for color designation, that is, any of the bar codes C3, C4, C5 and C6 (NO in step S115, NO in step S121 and YES in step S127) and if the memory 1 mode is set (YES in step S129), the read code is converted to color data of the corresponding color R, G or B and the data obtained by the conversion is stored in the memory 1 and then the memory 1 mode is cancelled (in step S131). If the memory 2 mode is set (NO in step S129 and YES in step S133), the read code is similarly converted to color data, which is stored in the memory 2 (in step S135).

If neither the memory 1 mode nor the memory 2 mode is set at the time of inputting the color data (NO in step S129 and NO in step S133), the input signal is disregarded and the processing flow returns to the main routine.

If the input signal is not the data instructing selection of the memory 1 or memory 2 nor the color data (NO in step S115, NO in step S121 and NO instep S127), the input signal is disregarded and the processing flow returns to the main routine.

The flow chart of FIG. 9 and the foregoing description do not mention control for turn-on/turn-off of the exposure lamp 93 in the color designation pen 9. This control is effected to turn on the exposure lamp 93 at the time of setting the bar code data input mode and to turn off the lamp 93 at the time of cancelling that mode.

(2) Designated Color Conversion Processing Routine (S7)

Figure 10:
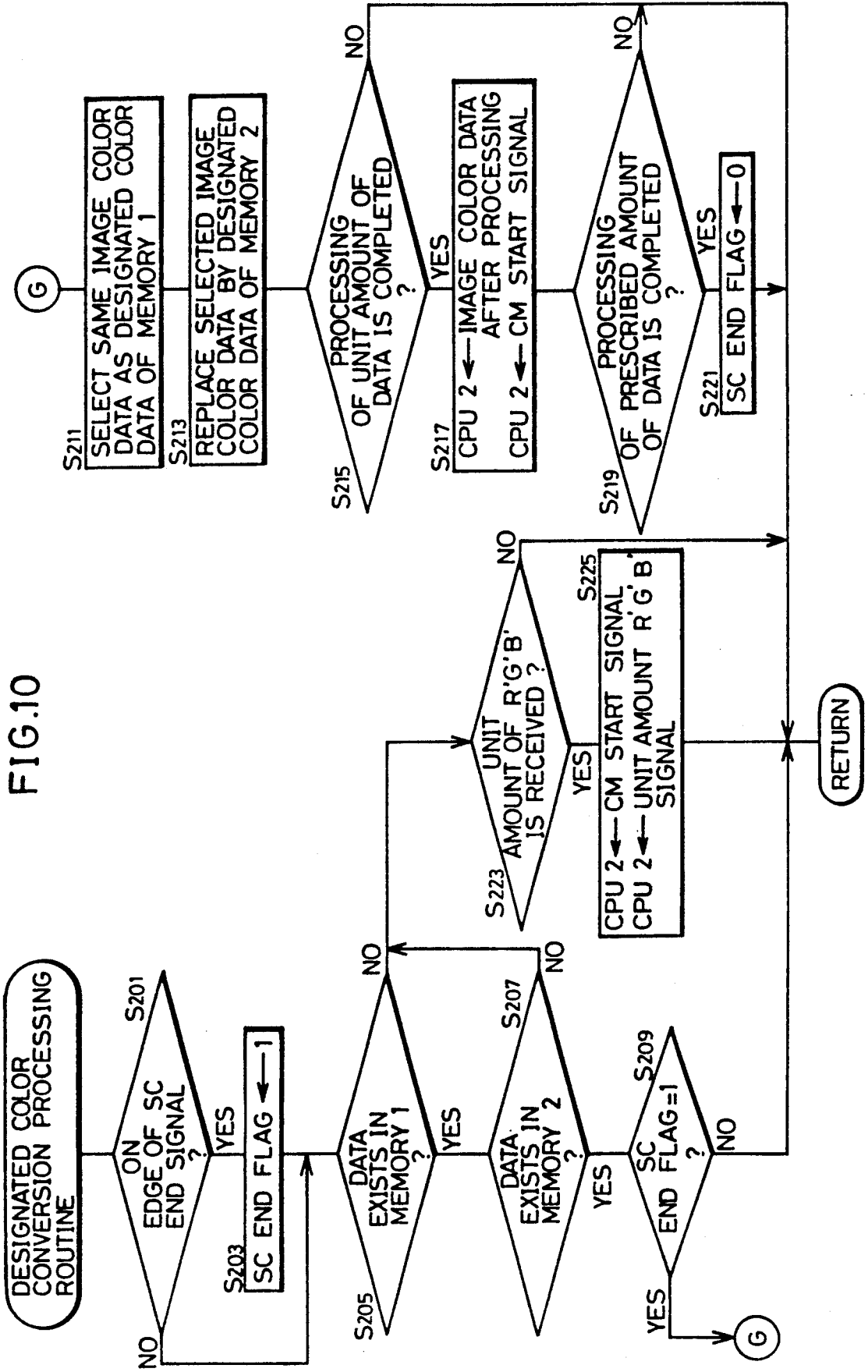
FIG. 10 is a flow chart showing a designated color conversion processing subroutine of the CPU1.

FIG. 10 is a flow chart showing details of step S7 (concerning the designated color conversion processing routine) called by the processing of the CPU1.

In this subroutine, when an on edge of an SC end flag (i.e., at timing signal transmitted for each end of shading correction of a prescribed amount of image data which is for example image data for four lines corresponding to 16 gradations), color data of a designated color corresponding area in the image data (an area of the same color as the designated color stored in the memory 1, obtained by decoding of the image data inputted from the photosensor 94) is replaced by the data of the designated color stored in the memory 2. This replacement is called color conversion processing.

If data is not stored in the memory 1 or the memory 2, each time a unit amount of image data from the CPU2 (an amount of data used as a unit for executing each image processing in the CPU2, such as shading correction or color masking processing; for example, data for one byte or data for one line) is received, a CM start signal instructing a start of color making processing as well as the received to the CPU2. As a result, after an end of shading correction, color masking processing is executed immediately without intervention of the above described color conversion processing.

Now, details of the processing flow will be described specifically. First, instep S201, the SC end flag transmitted from the CPU2 is determined and if the on edge thereof is detected (YES in step S201), the SC end flag is set (in step S203).

If data are stored in the memory 1 and the memory 2 (YES in step S205 and YES in step S207), and if the SC end flag is 1 (YES in step S209), the color conversion processing in steps S211 to S213 is executed.

More specifically, the area of the same color as the color of the color data stored in the memory 1 is selected (in step S211) from the image data transmitted from the CPU2 (i.e., the image data R' G' B' after the end of shading correction as shown in FIG. 4) and the color data of this area is replaced by the color data stored in the memory 2 (in step S213).

Each time processing of the unit amount of data including color conversion processing based on the above mentioned data and non-conversion because of absence of the area in the unit amount of data corresponding to the same color as that of the color data of the memory 1 is terminated (YES in step S215), image data (R" G" B" as shown in FIG. 4) after the processing as well as the CM start signal is transmitted to the CPU2 (in step S217) and color masking processing for the unit amount of data is started.

Each time processing of a prescribed amount of data (including color conversion processing and non-conversion of colors because the area of the same color as that of the color data in the memory 1 does not exist in the prescribed amount of data in the same manner as described above) is terminated (YES in step S219), the SC end flag is reset to zero (in step S211) and there is a wait for a subsequent input of the SC end signal.

If data is not stored in the memory 1 or the memory 2 (NO in step S205 or NO in step S207), the CM start signal and the received unit amount of image data are transmitted to the CPU2 (in step S225) each time the unit amount of image data (R' G' B') is received, and color masking processing is executed immediately after shading correction.

(3) Image Signal Processing Routine (S27)

Figure 11:
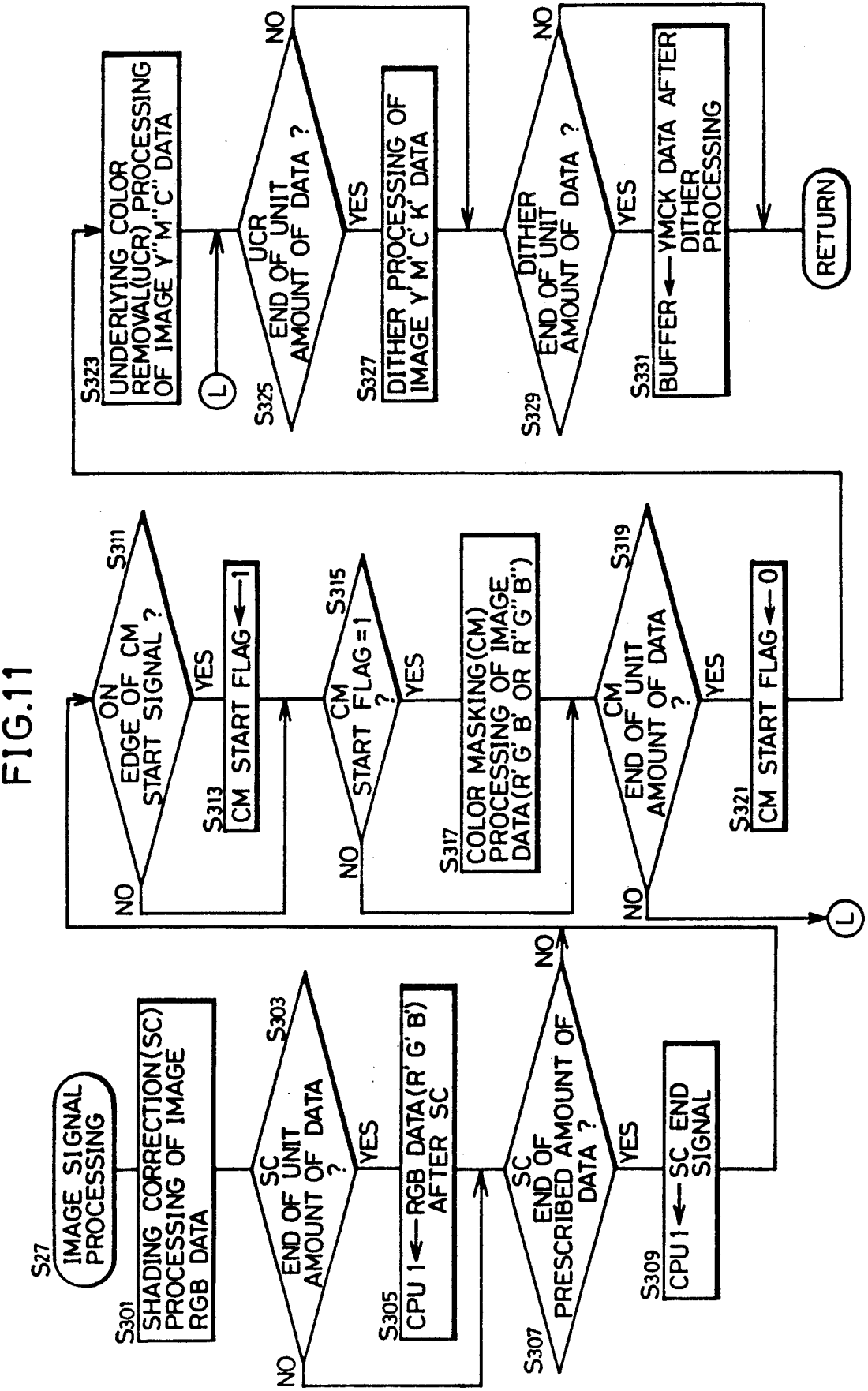
FIG. 11 is a flow chart showing an image signal processing subroutine of a CPU2.

FIG. 11 is a flow chart showing details of step S27 (concerning the image signal processing routine) called by the processing of the CPU2.

In this subroutine, shading correction (SC) processing (in step S301), color masking (CM) processing (in step S317), underlying color removing (UCR) processing (in step S323) and dither processing (in step S327) are successively executed for each unit amount of data and then an image signal is set as an output signal to the buffer 4 (in step S331).

The data (R' G' B' data) obtained after the shading correction (SC) is transmitted temporarily to the CPU1 for each unit amount (YES in step S303, and in step S305).

Further, the SC end signal is transmitted to the CPU1 at each end of shading correction (SC) of the prescribed amount (YES in step S307, and in step S309).

In response to the above described signals, the CPU1 returns the R" G" B" data obtained by color conversion processing (in the case of presence of data in the memories 1 and 2) or the R' G' B' data not subjected to such color conversion processing (in the case of absence of data in the memory 1 or 2) to the CPU2 for each unit amount.

The CPU2 executes color masking processing for the above mentioned returned unit amount of R" G" B" data (or R' G' B' data) when it receives the CM start signal transmitted from the CPU1 (in step S311).

After that, in the same manner as in the prior art, underlying color removal (UCR) processing and dither processing are executed successively for each unit amount of data.

The subroutine shown in FIG. 11 represents a processing flow in the case of executing the above described normal image signal processing in a single CPU (the CPU2). If a dedicated CPU is provided for each processing (each of shading correction processing, color masking processing, underlying color removal processing and dither processing) and timing of operation of each of those CPUs is controlled by a controller, the steps S301 to S309, the steps S311 to S317, the steps S319 to S323 and the steps S325 to S331 need only to correspond to the procedures of the respective dedicated CPUs.

As described above, according to the first embodiment, a digital image forming apparatus is provided which is capable of forming a color image where an arbitrary color of an original image is replaced by another arbitrary color different from the above mentioned arbitrary color. Selection of those two arbitrary colors is effected by reading bar codes corresponding to prescribed colors. Designation of correspondence between the selected color and the color before conversion (an arbitrary color in the original image) or correspondence between the selected color and the color after conversion (another arbitrary color) is also effected by reading bar codes related with respective cases.

According to the first embodiment, selection of colors and designation of the selected color as a color before conversion or a color after conversion are all effected by reading of the bar codes. Accordingly, a large number of colors can be selected or designated and the operation for the selection and designation is simple. In addition, a special device such as an edition input device is not required.

Second Embodiment

Next, the second embodiment using a ten-key group on the operation panel as color designation means will be described.

In the following, as to the portions of the second embodiment having the same construction as that in the first embodiment, the description thereof is omitted and only the different features will be described.

(1) Color Designation Ten-Key Group

Figure 13:
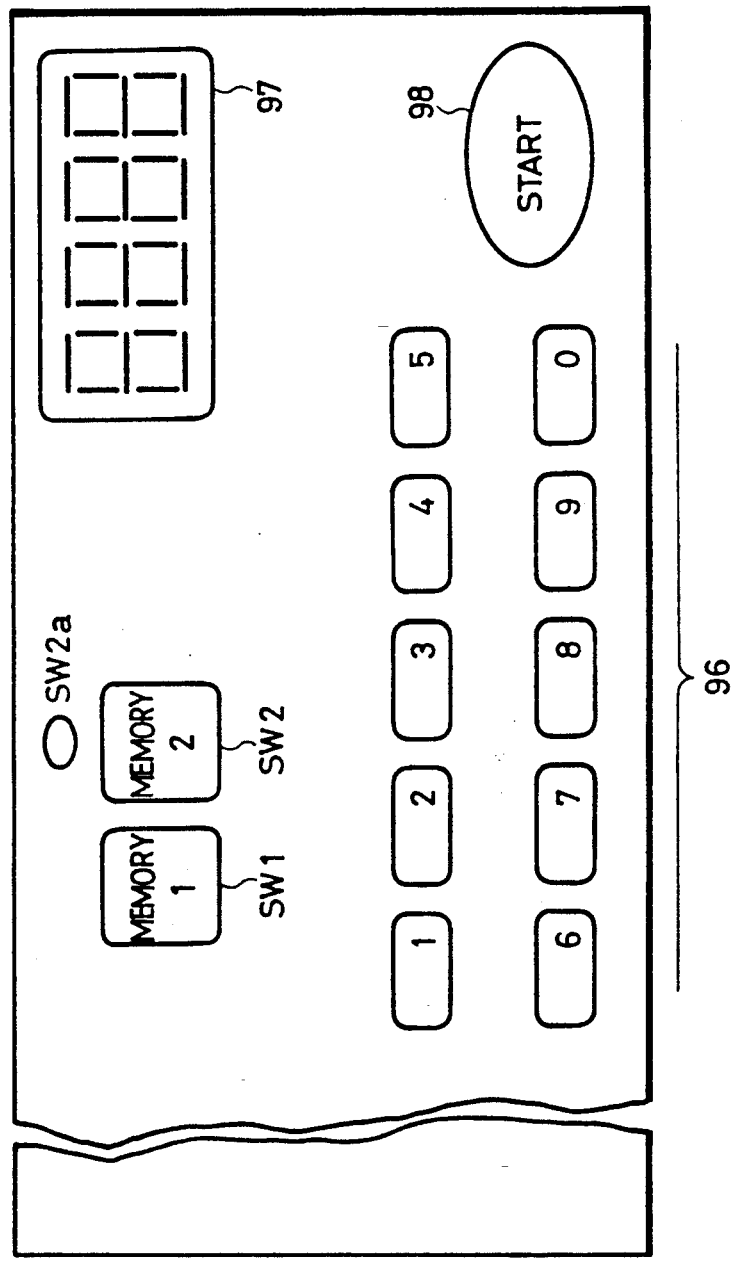
FIG. 13 is a plan view showing an operation panel of a digital copying apparatus according to a second embodiment of the present invention.

The color designation ten-key group 96 includes ten key switches corresponding to numerals of 0 to 9 arranged on the operation panel as shown in FIG. 13 and it has a numerical value input function.

The color designation ten-key group 96 is normally used to set the number of reproductions or to set a copying magnification. If the memory 1 mode or the memory 2 mode is set by the switch SW1 or the switch SW2, a color corresponding to the numerical value inputted by the ten-key group 96 is designated.

For example, numerical values correspond to respective colors with a one-to-one relation as described below.

| | | |
|---|---|---|
| 1: red | 2: coral | 3: orange |
| 4: brown | 5: mud yellow | 6: yellow |
| 7: yellowish green | 8: light green | 9: green |
| 10: dark green | 11: light blue | 12: grayish blue |
| 13: blue | 14: navy blue | 15: indigo |
| 16: bluish violet | 17: violet | 18: dark violet |
| 19: gray | | |

Thus, desired colors are designated by using the ten-key group 96. In other words, a variety of colors are prepared as colors to be designated since color designation is effected by using numerical values.

In the same manner as in the above described first embodiment, the memory 1 mode is a mode for storing a designated color in the memory 1, and the memory 2 mode is a mode for storing a designated color in the memory 2. The data stored in the memory 1 is used as color data before conversion and the data stored in the memory 2 is used as a color after conversion. The color designation ten-key group corresponds to the color designation pen of the first embodiment. In consequence, the components such as the scanning system, other than the color designation ten-key group are the same as in the case of the first embodiment.

Description of the Control Circuit

Figure 14:
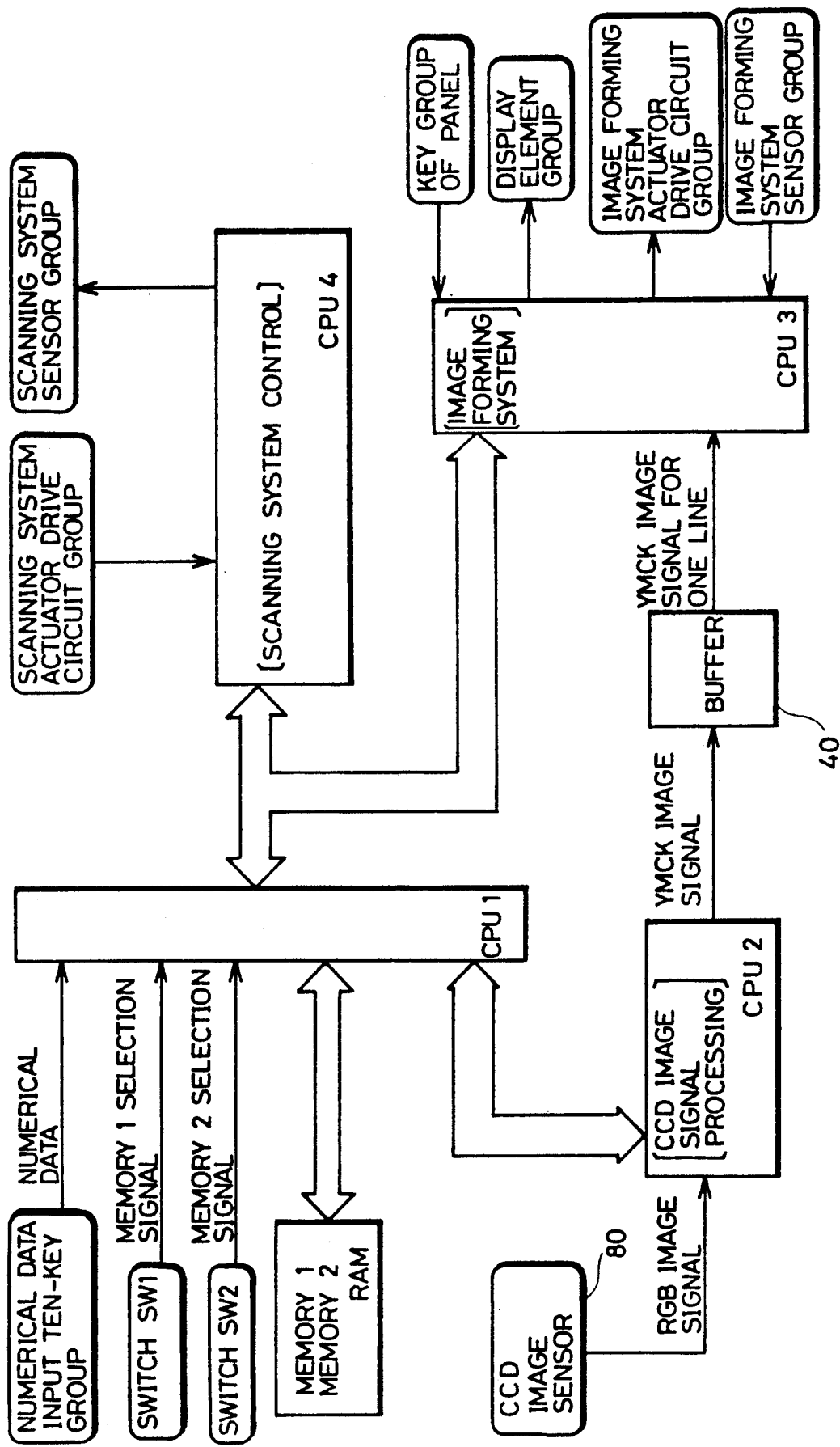
FIG. 14 is a block diagram of a control circuit of the second embodiment of the invention.
Figure 15:
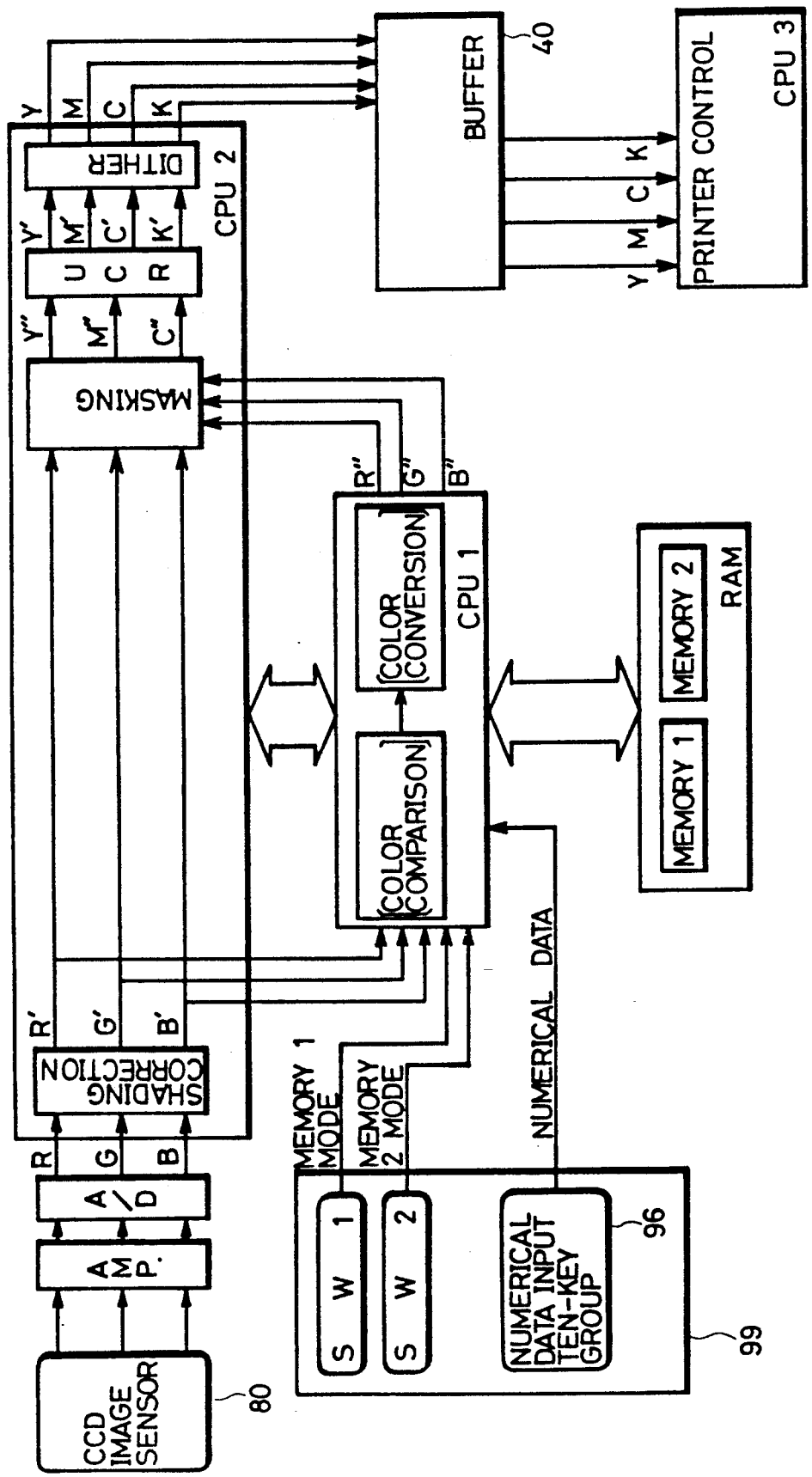
FIG. 15 is a specific block diagram of the control circuit mainly showing an image signal processing unit in the second embodiment of the invention.

FIGS. 14 and 15 are block diagrams showing a control circuit of the second embodiment of the invention and an image signal processing unit 20 of the control circuit, respectively. Those figures correspond to FIGS. 3 and 4 of the first embodiment.

Only the portions different from FIGS. 3 and 4 will be described below.

Referring to FIG. 14, in the second embodiment, data of a desired color is inputted to the CPU not by using the bar code reading sensor but by using the numerical value input ten-key group 96. As a result of this change, a data input instruction signal is applied by a memory selection signal as an output signal from the memory switches SW1 and SW2, not by the bar code data. The other portions are the same as in the case of the first embodiment.

Referring to FIG. 15, the same change as in FIG. 14 is made. A key switch group 99 on the operation panel is adopted in place of the color designation pen 9 shown in FIG. 4.

Description of Operation

Operation of the apparatus of the second embodiment will be described with reference to the flow chart.

Since the main routine of each CPU, the designated color conversion processing routine and the image signal processing routine are the same as those in the first embodiment, description thereof is omitted. In the following, only the color conversion signal input routine will be described.

Color Conversion Signal Input Routine (S5)

Figure 16:
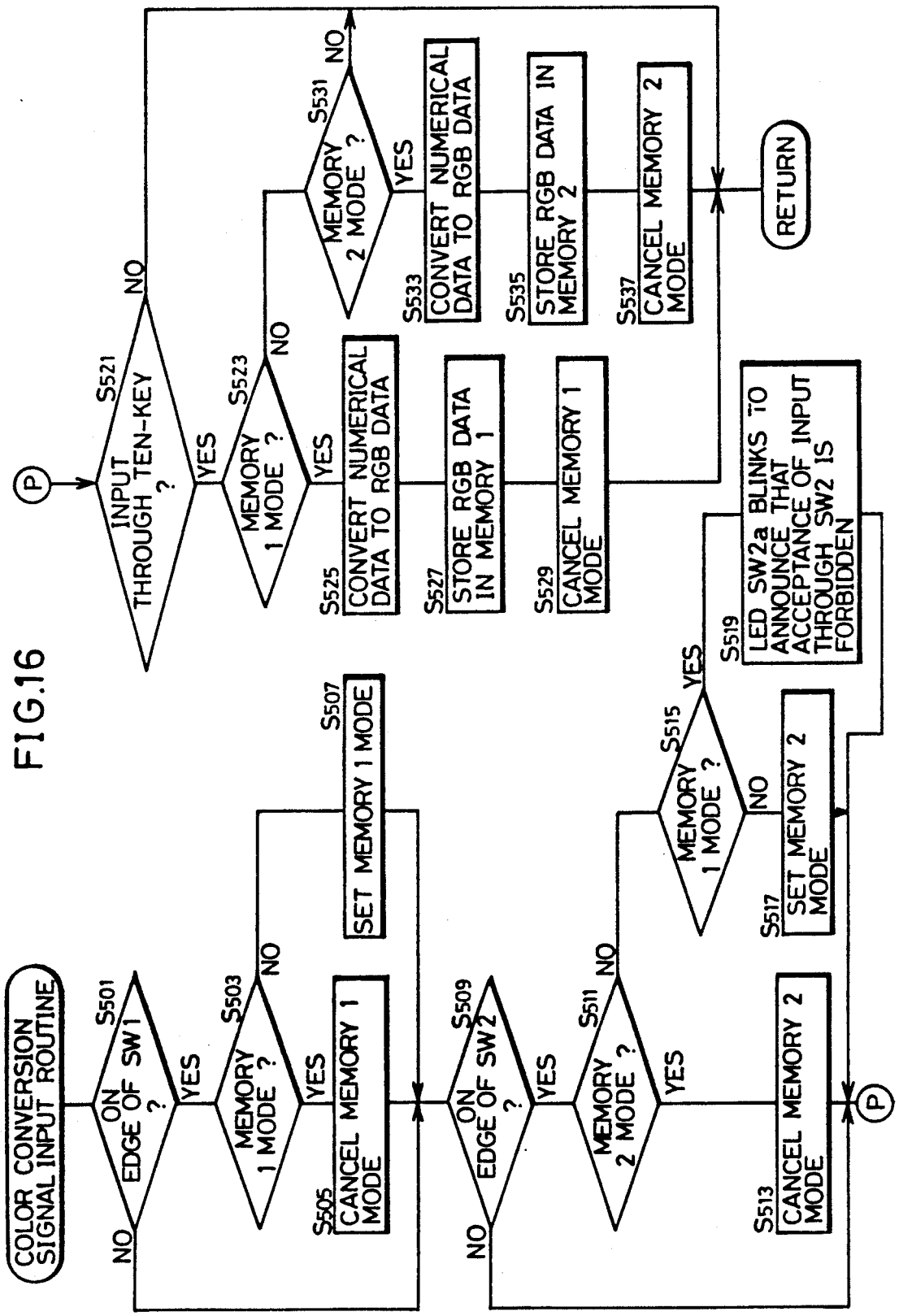
FIG. 16 is a flow chart showing detailed procedures of a color conversion input routine according to the second embodiment of the invention.

FIG. 16 is a flow chart showing details of step S5 related with the color conversion signal input routine in the second embodiment, called by the processing of the CPU1 shown in FIG. 5.

In this subroutine, the memory 1 mode is set or cancelled dependent on the on edge of the switch SW1 and the memory 2 mode is set or cancelled dependent on the on edge of the switch SW2.

More specifically, if the memory 1 mode is already set (YES in step S503) at the on edge of the switch SW1 (YES in step S501), the memory 1 mode is cancelled (in step S505). Conversely, if the memory 1 mode is not set (NO in step S503), the memory 1 mode is set (in step S507).

Similarly, if the memory 2 mode is already set (YES in step S511) at the on edge of the switch SW2 (YES in step S509), the memory 2 mode is cancelled (in step S513). Conversely, if the memory 2 mode is not set (NO in step S511), the memory 2 mode is set (in step S517) on condition that the memory 1 mode is not set (NO in step S515).

If the memory 1 mode is set (YES in step S515) at the on edge of the switch SW2 [YES in step S509), an alarm display LED lamp SW2a blinks to announce that input through the switch SW2 is forbidden (in step S519). This alarm serves to prevent simultaneous setting of both of the memory 1 mode and the memory 2 mode.

If numerical data is inputted by using the ten-key group 96 (YES in step S521), it is first determined whether the memory 1 mode or the memory 2 mode is set (in steps S523 and S531).

If it is determined that the memory 1 mode is set (YES in step S523), the inputted numerical data is converted to color data RGB of the corresponding color (in step S525) and the color data obtained by the conversion is stored in the memory 1 (in step S527). Then, the memory 1 mode is cancelled (in step S529). If the memory 2 mode is set (YES in step S531), the same procedures are executed (in steps S533 to S537).

If neither the memory 1 mode nor the memory 2 mode is set (NO in step S523 and NO in step S531) at the time input (YES in step S521) of numerical data through the ten-key group 96, the numerical value does not designate any color but it designate the number of reproductions, the copying magnification or the like. Therefore, the processing flow returns to the main routine.

Since the above mentioned processing is well known and does not have direct relation with the features of the present invention, description thereof is omitted.

As described above, according to the second embodiment of the invention, the digital image forming apparatus capable of forming a color image in which an arbitrary color of an original image is replaced by another arbitrary color different therefrom comprises the input means for designating either the first mode for setting a color before conversion (the abovementioned arbitrary color in the original image) as a selected color or the second mode for setting, as the selected color, a color after conversion (the abovementioned different arbitrary color). After the designation of either mode, a desired color is designated by input of a numerical value corresponding to a prescribed color.

As described in detail in the foregoing, according to the present invention, selection of colors and designation of the selected color as a color before conversion or after conversion are all effected by operation of the key input means. Thus, a digital image forming apparatus is provided in which operation for selecting colors can be carried out easily.

Since colors are designated by input of numerical values from a large number of colors associated with numerical values, a variety of colors can be designated. The numerical values can be inputted by using ten keys for input of the number of copies or the like provided in the conventional manner.

In addition, a special device such as an edition input device is not required.

The above described embodiments are related with a digital copying apparatus for forming an image on a photoconductor by modulating a laser beam based on an image signal. However, the present invention is not limited thereto. For example, as indicated in Japanese Patent Laying-Open No. 235170/1985 or 194469/1985, the present invention is needless to say applicable to a copying apparatus which forms an image by projecting light from an original directly onto a photoconductor and edits an image by utilizing light modulated based on an electric signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for forming an image containing a plurality of colors from an original document containing a plurality of colors, comprising:
   original document reading means for reading said original document and outputting color signals according to the plurality of colors;
   bar codes for identifying desired arbitrary colors out of the plurality of colors of the original document or the image, and its attributes;
   said attributes including a first attribute for identifying a first desired arbitrary color as a color of said original document and a second attribute for identifying a second desired arbitrary color as a color of said image;
   bar code reading means for reading said bar codes and outputting signals specifying said desired arbitrary colors and said attributes;
   color signal converting means responsive to the output signals from said bar code reading means, for converting first color signals representing the first desired arbitrary color identified by the first attribute read by said original document reading means into second color signals representing the second desired arbitrary color different from the first arbitrary color and identified by the second attribute; and
   image forming means for forming said image based on the second color signals obtained by the conversion of said color signal converting means.

2. An image forming apparatus in accordance with claim 1, wherein
   said color signal converting means converts a signal of a first desired arbitrary color specified by said first attribute to a signal of a second desired arbitrary color specified by said second attribute.

3. An image forming apparatus in accordance with claim 2, wherein
   said bar code reading means comprises
   first storing means for storing said first desired arbitrary color and
   second storing means for storing said second desired arbitrary color.

4. A color copying apparatus capable of editing color images for copying an original document with plural colors, comprising:
   image reading means for electrically reading an original image to generate multi-color image signals;
   bar codes for identifying colors, a first mode and a second mode;
   bar code reading means for reading said bar codes;
   mode selecting means for selecting the first mode when said bar code reading means reads the bar code of the first mode, and for selecting the second mode when said bar code reading means reads the bar code of the second mode;
   color designating means for designating a first arbitrary color in accordance with the bar code of the color read by the bar code reading means when the first mode is selected by said mode selecting means, and for designating a second arbitrary color different from the first arbitrary color in accordance with the bar code of the color read by the bar code reading means when the second mode is selected by said mode selecting means;
   converting means for converting a color signal of the designated first arbitrary color in said multi-color image signal generated by the image reading means to a color signal of the designated second arbitrary color; and
   image forming means for forming images based upon the multi-color image signal converted by said converting means.

5. A color copying apparatus capable of editing color images for copying an original document with plural colors, comprising:
   image reading means for electrically reading an original image to generate multi-color image signals;
   bar code reading means for reading bar codes respectively corresponding to colors;
   mode selecting means for selecting a first mode or a second mode;
   color designating means for designating a first arbitrary color in accordance with the bar code of the color read by the bar code reading means when the first mode is selected by the mode selecting means, and for designating a second arbitrary color different from the first arbitrary color in accordance with the bar code read by the bar code reading means when the second mode is selected by said mode selecting means;
   processing means for processing said multi-color image signal generated by the image reading means with respect to the first arbitrary color and the second arbitrary color different from the first arbitrary color designated by said designating means; and image forming means for forming images based upon the multi-color image signal processed by said processing means.

6. A copying apparatus capable of editing color images for copying an original document with plural colors, comprising:

bar code reading means for reading bar codes which correspond to colors;

mode selecting means for selecting a first mode or a second mode;

color designating means for designating a first arbitrary color in accordance with the bar code of the color read by the bar code reading means when the first mode is selected by said mode selecting means, and for designating a second arbitrary color different rom the first arbitrary color in accordance with the bar code of the color read by the bar code reading means when the second mode is selected by said mode selecting means;

image forming means for forming images based upon the multi-color image signal edited with respect to the first arbitrary color and the second arbitrary color designated by said designating means.

7. A color copying apparatus capable of editing color images for copying an original document with plural colors, comprising:

image reading means for electrically reading an original image to generate multi-color image signals;

inputting means for inputting numerals respectively corresponding to plural colors;

mode selecting means for selecting a first mode or a second mode, color designating means for designating a first arbitrary color in accordance with the numeral inputted by said inputting means when the first mode is selected by said mode selecting means, and for designating a second arbitrary color different from the first arbitrary color in accordance with the numerals of the color inputted by the inputting means when the second mode is selected by said mode selecting means;

converting means for converting color signals of the designated first arbitrary color in said multi-color image signal generated by the image reading means to color signals of the designated second arbitrary color; and image forming means for forming images based upon the multi-color image signal converted by said converting means.

8. A color copying apparatus capable of editing color images for copying an original document with plural colors, comprising:

image reading means for electrically reading an original image to generate multi-color image signals;

inputting means for inputting numerals respectively corresponding to plural colors;

mode selecting means for selecting a first mode or a second mode;

color designating means for designating a first arbitrary color in accordance with the numeral inputted by said inputting means when the first mode is selected by said mode selecting means, and for designating a second arbitrary color different from the first arbitrary color in accordance with the numerals of the color inputted by the inputting means when the second mode is selected by said mode selecting means;

processing means for processing said multi-color image signals generated by image reading means with respect to the first arbitrary color and the second arbitrary color designated by said designating means; and image forming means for forming images based upon the multi-color image signal processed by said processing means.

9. A color copying apparatus capable of editing images for copying an original document with plural colors, comprising:

inputting means for inputting numerals which respectively correspond to colors;

mode selecting means for selecting a first mode or a second mode;

color designating means for designating a first arbitrary color in accordance with the numeral which is inputted by said inputting means when the first mode is selected by said mode selecting means, and for designating a second arbitrary color different from the first arbitrary color in accordance with the numeral which is inputted by said inputting means when the second mode is selected by said mode selecting means; and image forming means for forming images based upon the multi-color image signal edited with respect to the first arbitrary color and the second arbitrary color designated by said designating means.

10. An image forming apparatus for forming an image containing a plurality of colors from an original document containing a plurality of colors and having a ten-key group for specifying the number of formations of said image, said ten-key group having a function of specifying each of the plurality of colors of said original document or said image, said image forming apparatus comprising:

original document reading means for reading said original document and outputting color signals according to said plurality of colors;

color type designating means for designating a first arbitrary type of color corresponding to a color of said original document or a second arbitrary type of color different from the first arbitrary type of color corresponding to a color of said image as said color specified by said ten-key group;

color signal converting means for converting said color signals read by said original document reading means in response to outputs of said color type designating means and said ten-key group; and imaging forming means for forming said image based on the color signals obtained by the conversion by said color signal converting means.

11. An image forming apparatus in accordance with claim 10, wherein said color signal converting means converts a signal of a first desired arbitrary color as the first type of color to a color signal of a second desired arbitrary color as the second type of color.

12. An image forming apparatus in accordance with claim 11, wherein said color type designating means comprises first storing means for storing said first desired arbitrary color, and second storing means for storing said second desired arbitrary color.

* * * * *